United States Patent

[11] 3,620,562

| [72] | Inventor | Masataro Sato<br>No. 28-26, Fukuakamachi 2-Chome,<br>Takamatsu, Japan |
|---|---|---|
| [21] | Appl. No | 30,191 |
| [22] | Filed | Apr. 20, 1970 |
| [45] | Patented | Nov. 16, 1971 |
| [32] | Priorities | Oct. 13, 1969 |
| [33] | | Japan |
| [31] | | 44/97764;<br>Nov. 10, 1969, Japan, No. 44/106462 |

[54] CONNECTOR-HOOK ASSEMBLY
4 Claims, 15 Drawing Figs.

[52] U.S. Cl. ................................................ 294/82,
24/232, 24/242
[51] Int. Cl. ................................................ B66c 1/34
[50] Field of Search ............ ................. 294/78, 82;
24/230.5, 232, 238, 241, 242

[56] References Cited
UNITED STATES PATENTS

| 1,434,052 | 10/1922 | English | 24/242 |
| 3,428,355 | 2/1969 | Hamilton | 294/82 |
| 2,864,644 | 12/1958 | Marryatt | 294/83 |

*Primary Examiner*—Richard E. Aegerter
*Assistant Examiner*—Johnny D. Cherry
*Attorney*—Browdy and Neimark

ABSTRACT: Connector-hook assemblies for suspending or lifting cargoes, fastening lines together, attaching a bracelet and the like, in which pairs of complimental hook elements are pivotally connected and include a displaceable lock comprising cooperating lock-notch portions and an abutment on respective hook elements or on the pivotal element therebetween, and in which at least one of the hook elements includes a portion for connection to a line, chain link or the like

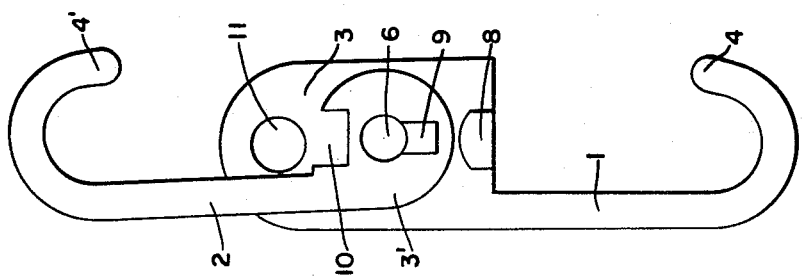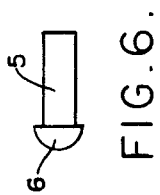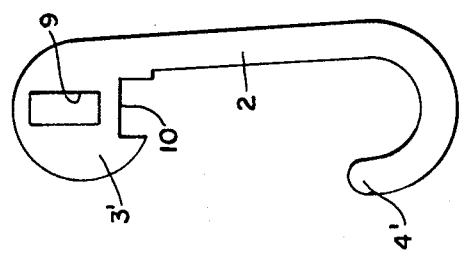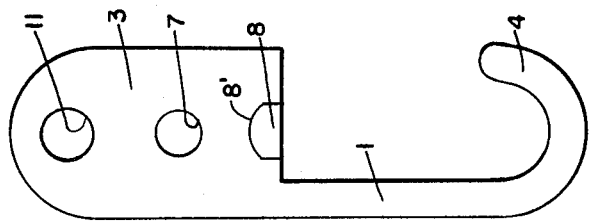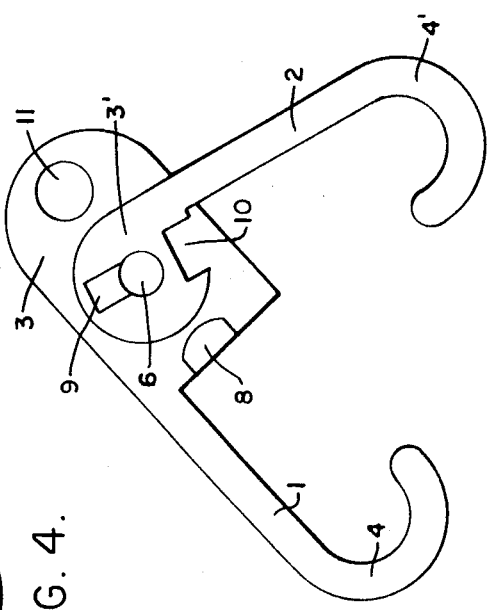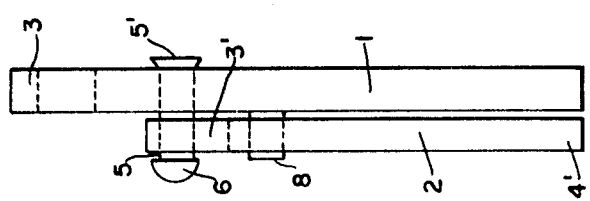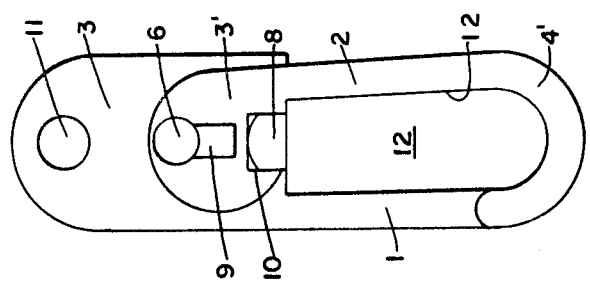

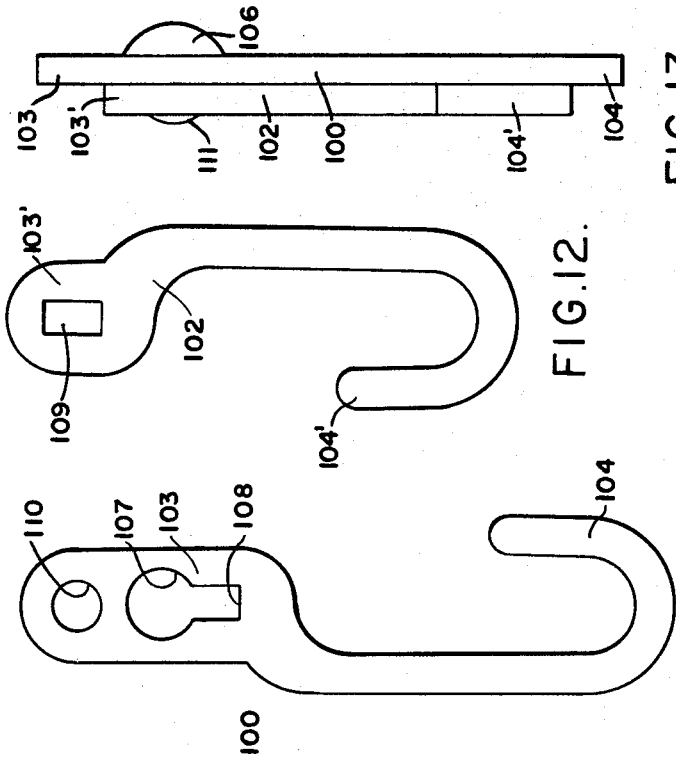
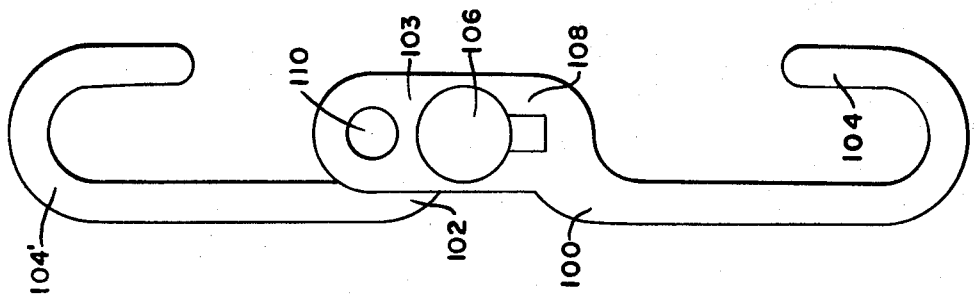
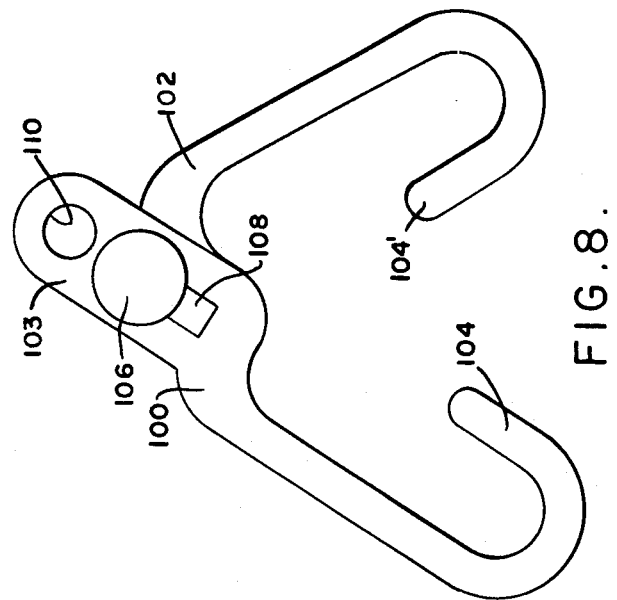
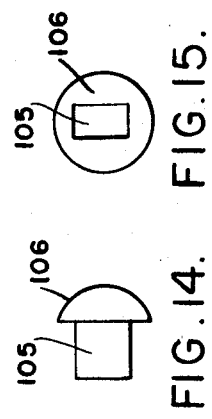

3,620,562

CONNECTOR-HOOK ASSEMBLY

BACKGROUND OF THE INVENTION

1. Field of the Invention

Releasable couplers are well known and are used wherever the free end of a rope, cable, chain, etc., is to be anchored or secured to a load, another cable, a connecting loop on a vehicle to be towed, for example, etc.

2. Description of the Prior Art Generally safety safety are provided to prevent accidental separation.

Hooks on the end of a lift cable payed out over a crane boom, for example, at times have included means for preventing the hook from becoming accidentally separated from a load being lifted. Further, when attaching tow-chains or cables to vehicles being towed, various types of safety latches are provided to prevent accidental separation.

SUMMARY OF THE INVENTION

The present invention provides coupler assemblies which are readily operated, which are urged toward a locking condition when subjected to tension from the lines to which they are attached and/or when subjected to a load being lifted; the coupler including, more particularly, oppositely directed, complimental hook jaws, pivoted about a common pivot pin, the jaws being pivotal between an "open" and "closed" position, and shiftable relative to the pivot pin between a "locked" and an "unlocked" position; and more particularly where the pivot pin comprises a lock structure portion cooperating with a complimental portion on one of the jaws, in one embodiment, and in which the lock structure comprises a complimentary structure lockingly engageable between the respective pairs of jaws.

These together with other and more specific objects and advantages will become apparent from a consideration of the following description when taken in conjunction with the drawing forming a part thereof:

BRIEF DESCRIPTION OF THE DRAWING

FIG. 1 is a front-elevational view of a connector-hook assembly embodying the invention and showing the assembly in a closed condition;

FIG. 2 is a side-elevational view looking from right to left at FIG. 1;

FIG. 3 is an elevational view of the connector-hook assembly showing it in an open condition;

FIG. 4 is an elevational view showing one of the hook members of the connector-hook assembly;

FIG. 5 is an elevational view of the other hook member of the assembly;

FIG. 6 is an elevational view of the pivot pin of the assembly;

FIG. 7 is an elevational view showing the connector-hook assembly in another open position where the hook members are in longitudinally opposed relationship and extend in opposite directions with respect to each other;

FIG. 8 is a front-elevational view similar to FIG. 3 and showing another embodiment of the connector-hook assembly;

FIG. 9 is an elevational view of the connector assembly of FIG. 8 and showing the same in a closed condition;

FIG. 10 is an elevational view similar to FIG. 7 and showing the connector-hook members in opposed longitudinal relationship;

FIG. 11 is an elevational view, similar to FIG. 4, and showing one of the hook members of the alternate embodiment;

FIG. 12 is a view similar to FIG. 5 and showing the other hook member of the alternate embodiment;

FIG. 13 is a side-elevational view, similar to FIG. 2, but showing the hook member of FIG. 12 slid to a position where the connector-hook assembly can be opened;

FIG. 14 is an elevational view of the connector or pivot pin of the assembly; and FIG. 15 is an end elevational view looking from left to right at the pivot pin of FIG. 14 and showing the polygonal configuration of the pivot pin.

DESCRIPTION OF THE PREFERRED EMBODIMENTS

Before referring to the drawings in detail, the present device relates to connector-hook assemblies for pulling, anchoring, and/or sustaining a load or the like. More particularly, the connector hooks of the present invention serve as couplers or connectors and have a variety of uses in many fields, and also provide a safety feature which is simple and relatively foolproof. The safety feature incorporated in both disclosed embodiments of the invention is urged into securing relationship due to the application of tension on the hook members, and the hook members are complimental, but are essentially mirror images of each other, so that when they are pivoted into overlying relationship, they form a closed loop in which a line, a ring or the like is readily coupled. In other words, these hook members tend to be urged toward locking relationship as tension is applied to the connector-hook assembly.

Further, the connector-hook assemblies can be secured to the end of a rope, cable or chain, and are used in various circumstances, for example, at building sites, when unloading ships, in various applications around the manufacturing factory, etc.

Additionally, the connector-hook assemblies are preferably constructed and designed to not only serve as means for hitching several elements together but also serve as a coupler. Basically, in accordance with the objects of the present invention, the novel connector-hook assemblies are characterized in that a pair of hook members are arranged in opposition to each other and are assembled on a mutual pivot pin so that the hook members can have relative rotational or swinging movement about the pivot pin, additionally, the hook members when subject to tension, incorporate a lock means cooperating between the hook members which is urged into locking relationship.

Referring to FIGS. 1–7, first considering FIG. 4, one of the hook members is indicated generally at 1 and comprises a lower, substantially J-shaped hook portion 4 which is integral with an upper shank portion 3 which is of a width substantially the span of the J-hook. As seen in FIG. 2, for example, the hook member 1 is substantially platelike, and the shank 3, which has a span substantially equal to the width of the J-hook, provides balance to the device.

Extending transversely through an upper portion of the shank 3 is an aperture 11 to which a line, cable or chain can be connected. Below the aperture 11 and extending transversely through the shank 3 is a circular aperture 7 which will have extending therethrough a circular cross sectioned axle or pivot pin 5 having a dome-shaped head 6. Extending laterally from the shank 3 and adjacent the opening of the bottom of the hook is a lateral abutment 8 which is substantially rectangular in elevation, preferably having a rounded top or crown 8'.

Considering FIG. 5, the other hook member is indicated at 2 and comprises a substantially J-shaped hook portion 4' which is of essentially the same dimensions as the hook portion 4 of member 1. The hook member 2 includes an upper shank or connecting portion 3' having extending therethrough a longitudinally extending, elongated rectangular slot 9 disposed above a downwardly opening, substantially rectangular notch 10.

As seen in FIGS. 1 and 2, the hook members 1 and 2 are assembled on the pivot pin 5 essentially in the attitude shown in FIGS. 4 and 5, and the pivot pin 5 is butted over at 5'; see FIG. 2 to retain the members in assembled relationship.

It will be noted that the J-shaped hooked portions of the respective hook members overlie and are complimental to each other, and thus form a closed loop 12 when the connector-hook assembly is closed, i.e., in the attitude shown in FIGS. 1 and 2. When the connector-hook assembly is closed, the abutment 8 is received in the downwardly opening notch 10 and the pivot pin 6 is at the uppermost portion of the elongated slot 9. This is the attitude of the parts when tension is applied through a cable, rope or chain attached to aperture 11, i.e., tension draws the abutment 8 into the notch 10 and prevents relative rotation between the respective hook members, i.e., to maintain a loop, lift ring, etc., in the loop 12 of the assembly.

When it is desired to open the hook members as seen in FIGS. 3 and 7, the hook member 2 is displaced or reciprocated longitudinally off of the abutment 8 and the slot 9 is so proportioned and dimensioned with respect to the abutment 8 that when the pin 5 is at the bottom of the slot 9, the abutment 8 will be free of the notch 10 and relative pivotal movement can be accomplished as seen in FIG. 3.

If it is desired to connect two elements having links or loops to each other, the assembly can be disposed in the attitude shown in FIG. 7 where the hook members 1 and 2 are in opposed longitudinal relationship. Of course, in this attitude, the assembly does not have the safety features previously mentioned, however, in emergency situations, it can be used purely as a connector and will satisfactorily perform the functions intended.

Referring to FIGS. 8–15, another embodiment of the invention is disclosed, and considering FIG. 11, one hook member 100 includes a J-shaped hook portion 104 including an integral upper shank portion 103 which has extending transversely therethrough a connecting aperture 110 as in the previously described embodiment. Below the aperture 110 and extending transversely the shank portion 103 is a keyhole slot 25 comprising a circular portion 107 in communication with a substantially rectangular notch or slot 108.

Referring to FIG. 12, a second hook member 102 includes a lower J-shaped hook portion 104'. The hook member is integral with a shank portion 103' which has extending transversely therethrough a rectangular, longitudinally extending aperture 109 substantially complimentary to the notch 108 of member 100.

Considering FIGS. 14 and 15, the pivot pin or connector pin is indicated at 105 and includes a dome-shaped head 106. As seen in FIG. 15, the pin portion is polygonal in elevation, i.e., rectangular and substantially complimentary to the slot 108 and transverse aperture 109 of the members 100 and 102, respectively. Additionally, it will be noted that the length of the pin 105 is equal to the diameter of the through aperture 107 to permit the member 100 to pivot about this pin when the connector-hook assembly is opened in the conditions shown in FIGS. 8 and 10. The hook members 100 and 102 are assembled in essentially the relationship or attitude shown in FIGS. 8 and 9, i.e., the pivot pin 105 extends through the keyhole slot 107, 108 and aperture 109 opposed members 100 and 102, respectively, and is headed over as illustrated at 111 in FIG. 13. It will be observed that the pivot pin shank 105 when disposed in the aperture 109 of member 102, does not rotate with respect to this member, however, and is fixed with respect to this member. However, the member 100 can be displaced within the limits of the keyhole slot comprising aperture 107 and slot 108. When tension is applied to member 110, when the hook members are assembled, the pin 105 is disposed in slot 108 and relative rotation between the respective hook members does not occur, i.e., see FIG. 9. When it is desired to open the members to the position shown in FIG. 8, for example, the member 100 is moved downwardly with respect to the pin 105, and the pin will then be in the circular portion 107 of the keyhole slot, and in this attitude the member 100 can be pivoted relative to the member 102 to open the connector-hook assembly and attach the same to a connecting ring, loop, etc. When the members are repivoted back into complimental or loop-forming relationship as illustrated in FIG. 9, the loop being indicated at 112, the polygonally shaped pin 105 is received in the complimentary portion of the slot 108 and relative rotation between the members 100 and 102 is prevented.

As illustrated in FIG. 10, which is similar to FIG. 7 of the first described embodiment, the hook members 100 and 102 when disposed in longitudinal relationship, will have their hook portions 104 and 104', respectively, at opposite ends which can provide means for connecting two members together.

What is claimed is:

1. A hook assembly comprising:
   first and second hook members,
     said hook members including mutually reversed, complimental hook portions for forming a closed, retention-loop; and
   a pivot extending transversely through overlying portions of said members for permitting relative pivotal movement therebetween,
     at least one of said members including means for engagement to a tension element such as a cord, cable, chain or the like,
   hook members and pivot including cooperating lock means for permitting relative reciprocal and pivotal movement between said hook members when opening the hook assembly, and said lock means including an abutment preventing relative pivotal movement between said hook members when tension is applied to said one member and the members are closed;
   the improvement wherein, said pivot comprising a pin having a circular cross section,
   one of said hook members having a circular aperture and being journaled on said pin,
   the other of said hook members including an elongated slot extending longitudinally from said hook portion and through which said circular pin extends for permitting said other member to be both pivoted and reciprocated on said pin, said other member including a downwardly opening notch in alignment with and immediately below said slot, the first one of said hook members including an abutment disposed immediately below said circular aperture and projecting laterally from one side of the member and substantially parallel to the pivot for removable engagement in said notch when said hook members are in complimental, overlying, loop-forming closed relation.

2. The structure as claimed in claim 1, in which said notch and abutment are generally rectangular in elevation and are so proportioned in relation to said slot to permit longitudinal separation of said abutment and notch and relative rotation between said hook members about said pivot, said means for engaging with a tension-element member being on the member having the abutment thereon.

3. The structure as claimed in claim 2, in which said pin abutment is relieved at its portion immediately adjacent to rectangular slot for facilitating movement of said slot onto the abutment when the hook assembly is being closed.

4. The structure as claimed in claim 1, in which said hook members each include a lower J-shaped jaw portion terminating in an upper shank through which said pivot extends, said hook members comprise platelike elements.

* * * * *